United States Patent [19]
Calvet et al.

[11] 3,905,230
[45] Sept. 16, 1975

[54] DEVICE FOR MEASUREMENT BY ACTIVE SENSOR

[75] Inventors: Pierre Calvet; Francois Liousse, both of Toulouse, France

[73] Assignee: Office National d'Etudes et de Recherches Aerospattiales (O.N.E.R.A.), France

[22] Filed: July 5, 1973

[21] Appl. No.: 376,416

[30] Foreign Application Priority Data
July 21, 1972 France .............................. 72.26310

[52] U.S. Cl. .................................. 73/204; 73/399
[51] Int. Cl.² ....................... G01F 1/68; G01P 5/12
[58] Field of Search ...................... 73/204, 362, 399

[56] References Cited
UNITED STATES PATENTS

| | | | |
|---|---|---|---|
| 3,216,249 | 11/1965 | Joel | 73/399 |
| 3,246,523 | 4/1966 | Richard | 73/399 |
| 3,498,128 | 3/1970 | Calvet | 73/204 |
| 3,587,318 | 6/1971 | Belugoo et al. | 73/204 |
| 3,719,083 | 3/1973 | Morris | 73/204 |

*Primary Examiner*—Herbert Goldstein

[57] ABSTRACT

The device comprises a thermoresistance sensor for immersion in the medium to be studied; a generator for delivering to the sensor a first electrical pulse and, at the end of a predetermined time interval sufficiently short for the sensor not to have returned to thermal equilibrium with the medium, at least one second electrical pulse. Means are provided for measuring the resistance of said sensor during the first pulse and during the second pulse.

14 Claims, 6 Drawing Figures

DEVICE FOR MEASUREMENT BY ACTIVE SENSOR

BACKGROUND OF THE DISCLOSURE

The present invention relates to measurements by active sensor. It relates more particularly to a device for the measurement of a property of a medium in which a thermoresistant sensor (i.e., a sensor having a temperature dependent resistance) is immersed, which property is related to the heat transfers between the sensor and the medium.

A prior art method of measurement by active sensor which is already known and was described in U.S. Pat. No. 3,498,128 in the name of Pierre Calvet, is characterised in that a modification of the state of the sensor is caused in the form of short pulses, and in that there is measured, by means of an indicator, the signal of which the sensor is the site as a result of the modification, as a function of the phenomenon to be measured, created around the sensor by the disturbance caused by each pulse.

This patent describes also a method of measurement according to which the sensor is successively used as a passive sensor (that is to say without there being any appreciable transfer to energy from the sensor to the ambient medium) and an active sensor (that is to say itself causing, by introduction of energy, disturbances by means of which there are established in the medium localised modifications dependent on the property of the medium that it is desired to observe).

It is an object of the present invention to provide a measuring device making use of a sensor which is used alternatively and successively as a passive sensor and as an active sensor, which device is improved with respect to those which are the subject of U.S. Pat. No. 3,498,128.

SUMMARY OF THE INVENTION

To this end, the invention provides a device which comprises a thermoresistant sensor for immersion in a fluid medium to be studied; a generator adapted to deliver to said sensor, in succession, a first pulse and, at the end of a predetermined interval of time sufficiently short for the sensor not to have returned to thermal equilibrium with the medium, at least one second electrical pulse; and means for measuring the resistance of the sensor during the first pulse and during the second pulse.

The device defined above has at the same time the favourable characteristics of that described in the aforementioned patent and additional advantages, especially the following:

Since a signal representing the resistance of the sensor is taken off only during short intervals of time (those during which the pulses are applied), signals coming from several sensors can be treated in a same data processor or, in other words, it is possible to multiplex signals coming from various sensors.

Since the pulse intended for the measurement is extremely short, it is possible to use a high voltage pulse which would be incompatible with permanent operation; hence preamplification of the signals provided by the sensor can be dispensed with.

The sensor can be left to return to equilibrium with the ambient medium between two measuring sequences. Then there will be, in each sequence, an interval of time during which the sensor will operate as a passive sensor, (until its temperature is measured whilst it is in thermal equilibrium with the medium) then an interval of time during which it operates as an active sensor.

In the case where the sensor is not allowed to return to equilibrium with the medium between two successive sequences of measurement, it will generally be preferable to apply in each series, after a first electrical pulse intended to increase the temperature of said sensor and to provide it with the energy which will then be transmitted to the ambient medium, several successive short electrical pulses of the second type whilst the sensor approaches its state of thermal equilibrium with the medium. By extrapolation of the results obtained on temperature measurements associated with delivery of pulses of the second type, it will be possible to reconstitute the state of thermal equilibrium without the necessity to allow the sensor to return to it and, consequently, to considerably increase the speed of measurement.

If, in particular, an electrical pulse for increasing the temperature is followed by a first measurement pulse after a time which is a small fraction of the equilibrium return time, then by a second measuring pulse after a much longer time, it will be possible to deduce magnitudes characteristic of the various properties of the medium from the measured results. More precisely and as will be seen below, it will be possible, if the sensor is constituted by a wire positioned in a flowing gas, to determine at the same time the thermal diffusivity of the gas (which influences the first measurement preponderantly) and the speed of flow of the gas (which influences in preponderant manner the result of the second measurement).

The invention will be better understood after reading the following description of particular embodiments of the invention.

DESCRIPTION OF PREFERRED EMBODIMENTS

Figure 1:
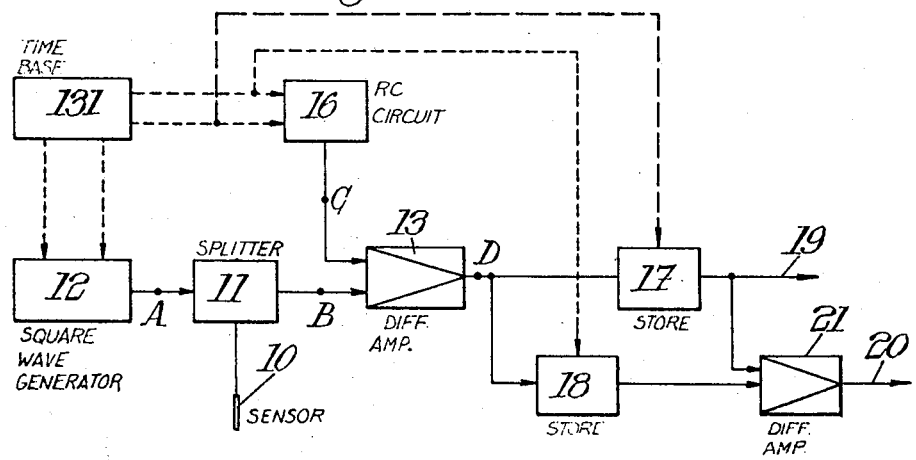
FIG. 1 is a simplified block diagram of a device according to the invention.

The device illustrated in FIG. 1 is intended for measuring, from the thermal transfers between a sensor 10 and a fluid body in which it is immersed, a characteristic of this fluid, such as its pressure or its flow speed.

The sensor, constituted by a thermoresistant probe, is coupled through a splitter circuit or signal directing circuit 11, which may consist of a Wheatstone bridge (the sensor being placed in one of the diagonals) on one hand to a square wave generator 12, on the other hand to one of the inputs of a differential amplifier 13. The generator 12 is adapted to supply successively, during a measuring sequence, a first pulse 14, from the time $-t_e$ to the moment O, then a short pulse 15 of measurement beginning at time $t_1$. The two pulses are shown diagrammatically in FIG. 2 on line A. The location where they appear is, in similar way, indicated by A in FIG. 1. A time base or clock 131 determines the sequence of emission of the pulses, their moment of appearance and their duration.

The differential amplifier 13 of the device illustrated in FIG. 1 enables the reconstitution, from measurements made on the sensor 10, of a differential measurement with respect to a sensor which would be in a medium having a constant temperature and constant heat dissipation properties, which medium is taken as a reference medium. This reference sensor is simulated by an RC circuit energized by the time base 131 in synchronism with the generator 12, as indicated in FIG. 1 where, for greater clarity, the control connections are indicated by dashed lines, whilst the signal paths are indicated in full lines.

Before describing in more detail the device and its operation, it may be useful to recall several theoretical considerations.

If it is first assumed that the heating pulses are sufficiently short for there to be no appreciable heat transfer from the sensor to the medium during their duration, and if the coefficient of thermal dissipation of the sensor remains constant during its return to equilibrium, the cooling of the sensor is effected according to the law:

$$q \frac{d\theta}{dt} = k(\theta - \theta_e) \quad (1)$$

In the above formula, $q$ denotes the heat capacity of the sensor, $k$ its coefficient of thermal dissipation, and $\theta_e$ the equilibrium temperature.

The origin of time being selected at the end of the energizing pulse 14 (FIG. 2) when the temperature of the sensor is $\theta_o$, there is obtained, by integrating the equation (1) over the interval of time going from O to $t_1$, at the beginning of the pulse 15:

$$\theta_1 - \theta_e = (\theta_o - \theta_e) \exp\left(-\frac{k}{q} t_1\right) \quad (2)$$

If the variations of the equilibrum temperature $\theta_e$ are slow, it is seen that $\theta_1 - \theta_e$ only depends on the value of $k$ for a fixed interval of time $t_1$.

In practice, the law of temperature decrease is not perfectly exponential, the phenomena which come into play not being purely convective. However, the measurement of the temperature at movement $t_1$ still enables the coefficient $k$ of thermal dissipation of the sensor to be characterised or at least its average values, whatever the preponderant mode of exchange.

Figure 2:
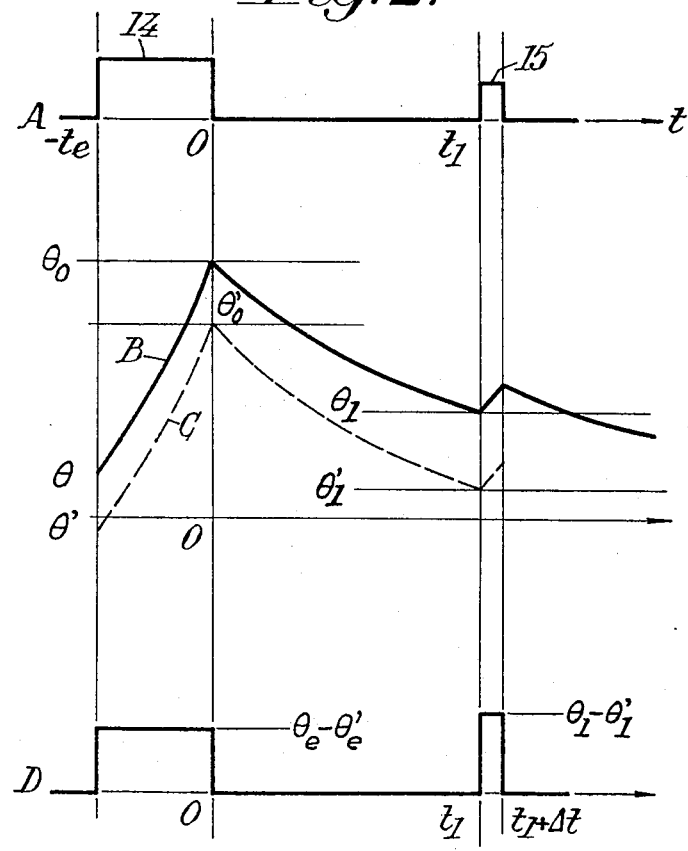
FIG. 2 is a synoptic diagram giving the shapes of the signals which appear at various points of the block diagram of FIG. 1.

However with the simplifying hypothesis made above, the application to the sensor 10 and to the simulator circuit 16 of voltage pulses having the shape indicated in line A of FIG. 2 results in the application to the input of the differential amplifier 13 of signals having the shape indicated in the second diagram of FIG. 2. The curve denoted by B corresponds to the output signal from the splitter 11, representing the temperature of the sensor. The curve C indicates the output signal of the simulator circuit 16 which first integrates the pulse received from the time $-t_e$ until O, then is discharged according to a substantially exponential law. The curves B and C being substantially parallel for the duration of the charging periods, there is successively found at the output D of the differential amplifier 13 the square signals representing, the first $\theta_o - \theta_o'$ or, as well, $\theta_e - \theta_e'$ ($\theta_e'$ denoting the equilibrium temperature which a sensor would take up under the reference conditions simulated by the circuit 16), whilst the second square peak represents $\theta_1 - \theta_1'$. Separate switch means, not shown, must of course be provided to bring back the output of the differential amplifier to O at the moments O and $t_1 + \Delta t$, that is to say at the end of each pulse. It is seen that, although in the absence of the circuit 16 it would be necessary to store almost instantaneouly the signal provided by the sensor at the moments $-t_e$ and $t_1$, which would present difficulties in design of the hardware, the device according to the invention delivers that signal with constant values to the circuit 17 for storage of $\theta_e - \theta'_e$ and to the circuit 18 for storage of $\theta_1 - \theta'_1$ for a duration sufficiently long to achieve good accuracy.

The temperature difference $\Delta\theta_e = \theta_e - \theta'_e$ characterizing the thermal dissipation coefficient of the sensor 10 in the medium under the study is thus available at the output 19 of the storage circuit 17. The difference $(\theta_1 - \theta'_1) - (\theta_0 - \theta'_0) = (\theta_1 - \theta_0) - (\theta'_1 - \theta'_0)$, which is directly related to the difference between the actual coefficient of thermal dissipation (or heat transfer) and the thermal dissipation coefficient of a sensor in the reference medium, is available at the output 20 of the differential amplifier 21 having its inputs respectively connected to the outputs of storage circuits 17 and 18.

Numerous embodiments of the schematic circuit illustrated in FIG. 1 may be designed. There will not be described, by way of example, the device illustrated in FIG. 3, intended for the measurement of very weak slow pressure variations in an enclosure at a speed of measurement which can achieve several hundreds of cycles per second. For greater clarity, the components of the circuit of FIG. 3 which have a couterpart in the diagram of FIG. 1 will denoted by the same reference numeral, modified by the index $a$.

Figure 3:
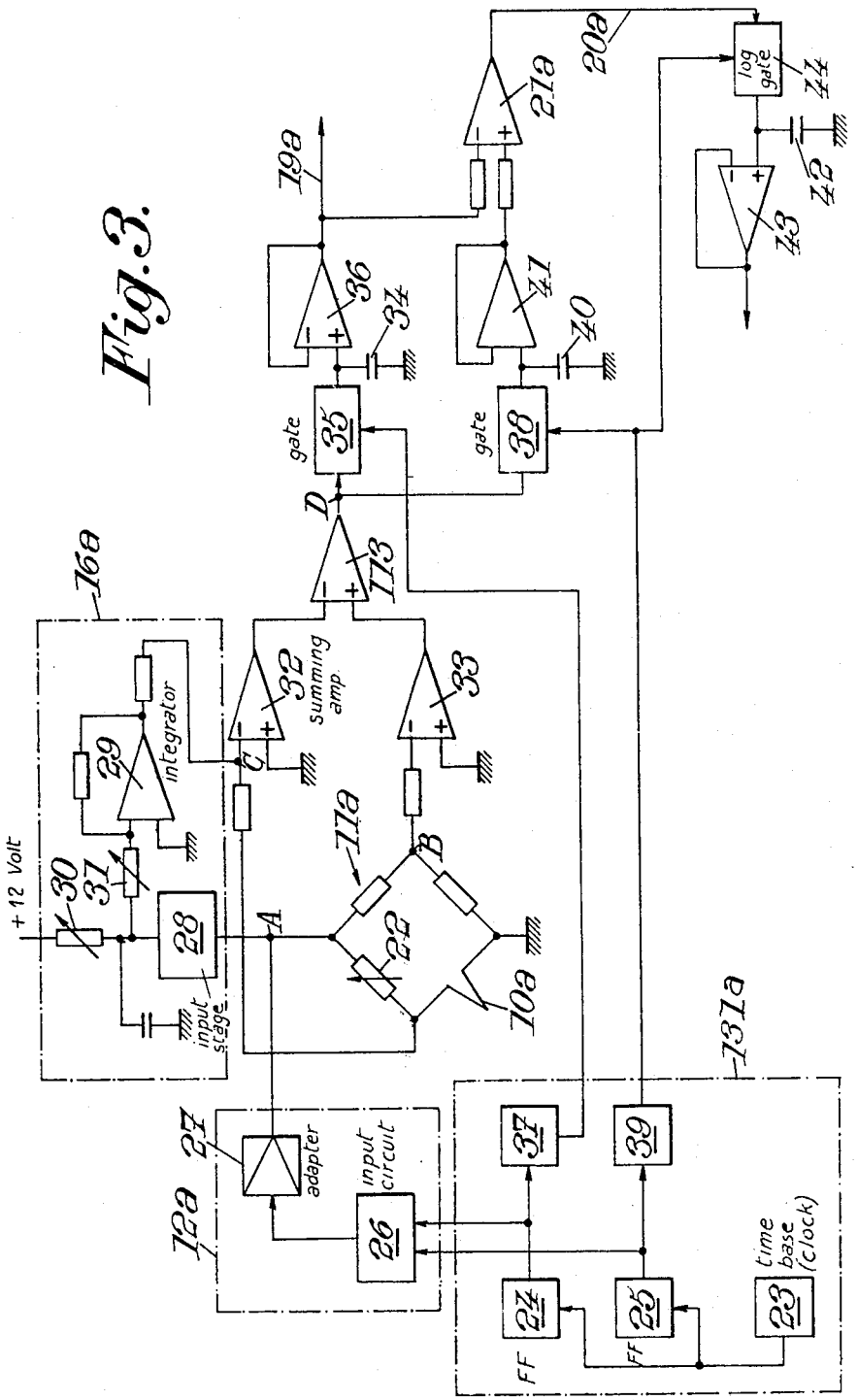
FIG. 3 is a block diagram of a device operating substantially according to the principles of the circuit of FIG. 1.

There is to be found in the device of FIG. 3 the splitter circuit $11_a$, constituted by a Wheatstone resistance bridge, which comprises in one arm the thermoresistant probe $10_a$. The thermal inertia of this probe must be as low as possible to enable a high speed of measurement and in general it will be several ohms. The three other arms of the bridge include reference resistances, of which one, 22, is adjustable to balance the bridge.

One of the angles of the supply diagonal of the bridge is grounded. The other angle, constituting the counterpart of the point A of the FIG. 1, is connected to a generator $12_a$ controlled by a sequencing assembly $131_a$. This assembly, shown in very diagrammatic manner, includes a time base 23 which emits pulses at a frequency which fixes the frequency of the measurement cycles. The pulses supplied by the time base 23 are applied to two circuits 24 and 25 each comprising flipflops. The circuit 24 is provided to deliver to the input circuit 26 of the pulse generator $12_a$ (constituted by an amplifier provided with a voltage divider for adjustment of the output power), a square pulse of predetermined width, from time $-t_e$ to time O. The duration of this pulse can be regulated by acting on the characteristics of monostable flip-flop in the circuit 24.

The circuit 25 supplies, in a similar way, with a delay $t_1$ with respect to the moment O, the second measuring pulse. There again the delay $t_1$ and the pulse width can be adjusted by acting on the characteristics of a monostable flip-flop in circuit 25.

The pulse generator $12_a$ also comprises an adapter stage 27, supplied by the input circuit 26, for amplifying the signal to a level compatible with the low resistance of the probe. In practice, to avoid disturbances which extend to the whole of the medium whose parameters are to be measured, the energy supplied by the pulses of the first type is preferably of some microjoules at most, but with a peak power which can be very high if the duration of the pulse is limited to some microseconds. The high power which is possible to dissipate, given that the bridge is not supplied continuously but only by very short pulses, enables very considerable gain in sensitivity with respect to prior devices, such as those which are the subject of the previously mentioned patent.

The pulses applied by the adapter 27 (whose amplitudes may be different according for a pulse of the first type, ending at moment O, and for a pulse of the second type, starting at moment $t_1$) are applied not only to the bridge $11_a$, but also to the simulating circuit $16_a$. This circuit comprises successively an input stage 28 and an operational amplifier 29 mounted as integrator, intended to supply a signal compensating for the decreasing portion of the signal from the sensor 10, as illustrated in the second diagram of FIG. 2. The time constant of the RC integrating circuit may be adjusted by means of the bias potentiometer 30, whilst the amplitude of the compensating pulses can be adjusted by means of the input resistor 31 of the operational amplifier 29.

The voltage at the terminals of the sensor and the compensating voltage supplied by the amplifier 29 are then summed in an operational amplifier 32. The voltage supplied by amplifer 32 is then applied to one of the inputs of a differential amplifier 113. The other input of amplifier 113 receives the unbalance voltage of the bridge, picked up at point B, and amplified at 33.

The gain of the differential amplifier 113 is selected as a function of the desired sensitivity. In general, a gain of about 10 constitutes a satisfactory compromise between the requirements of high sensitivity and tolerable background noise.

The output voltage signal of the differential amplifier 113 is then temporarily stored in analog form in a capacitor 34. For that purpose of linear or analog gate 35 enables the signal at D to be transmitted to the input of an operation amplifer 36 having an input capacitor 34 for operating as a peak voltage detector. The linear gate 35 is enabled by strobe pulses derived from the pulses supplied by the flip-flop circuit 24. For this, there is used an assembly 37 which removes the lateral portions and transmits only the mid portion of the square wave emitted by the circuit 24. That mid portion enables the gate 35 during part only of the duration of the output signal of the differential amplifier 113 and that part is sufficiently delayed with respect to the leading edge to avoid the transients which alter the measurement. The circuit 37 may consist of a simple combination of linear gates, univibrators and flipflops for providing a strobe pulse which is straddled by the pulse from 24; since it is conventional, it need not be discussed here in more detail. The signal respresenting the initial temperature $\theta_c$ appears thus at the output $19_a$ of the amplifier 36.

In similar way, an analog gate 38 and an strobe signal assembly 39 sample a fraction of the width of the square signals supplied by the flip-flop circuit 25; the strobe signal is so delayed that the capacitor 40 associated with the operational amplifier 41 stores a value of the temperature at moment $t_1$ which is largely free of transients.

Finally, the differential amplifier $21_a$ supplied at its output $20_a$ the temperature difference between the moments O and $t_1$, which difference characterises the heat dissipation properties of the medium. This difference is stored in its turn in a capacitor 42 associated with an operational amplifier 43, supplied through a logic gate 44, of which the opening is also controlled by pulses applied by the assembly 39.

Figure 4:
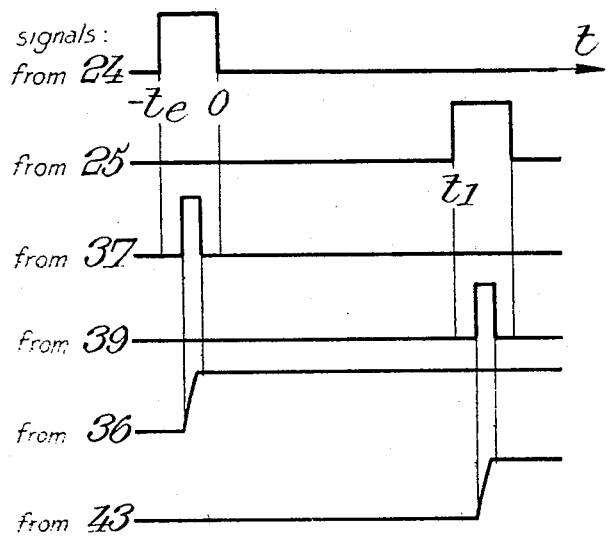
FIG. 4 is a snyoptic diagram giving the variations of the signals which appear at various points of the device of FIG. 3.

The constitution of a complete measuring sequence of the device of FIG. 3 is indicated diagrammatically in FIG. 4. In this Figure, each line carries a reference numeral which denotes the member on the output of which appears the signals which is represented. The time delay between the leading edge of the strobe pulses emitted by the assemblies 37 and 39 corresponding pulses supplied by the flip-flop circuits 24 and 25, appear on the first four lines; the storage (permanent until a "clear" signal is received prior to arrival of the following pulse) of the signals in the outputs of the amplifiers 36 and 43 are illustrated in the last two lines.

According to the value selected for the time interval between time O and time $t_1$, the result obtained at the output of the device, characterising the heat dissipation properties, is, at least in certain cases, related to different properties of the medium. In particular, it is known that the initial cooling of a heated wire in a gaseous medium (until a moment $t_1$ very close to O) depends on the thermal diffusivity (which is connected with the pressure of the gas), the flow speed of the gas around the wire then having little influence on the temperature $O_1$. On the other hand, the later variation of the temperature of the sensor, when it approaches equilibrium temperature, depends mainly on the pressure and the speed.

Figure 6:
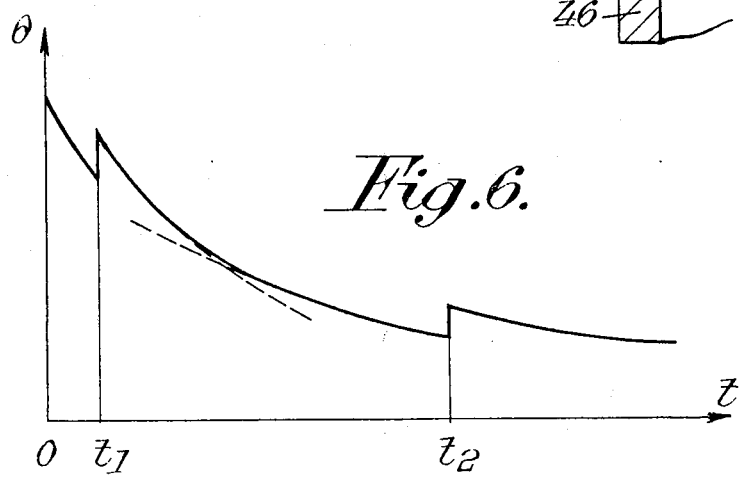
FIG. 6 illustrates one of the possible shapes of the curves of variation of the temperature of a sensor as a function of time, when the latter successively receives a first pulse and then two successive measuring pulses and is immersed in a fluid of which two distinct connecting properties have, one, a perponderant influence on the cooling immediately after reception of the first measuring pulse, the other, on the cooling after a longer time.

Consequently, it will be possible, with the device illustrated in FIG. 3 and by using a short measuring time interval, to obtain an indication of the pressure of the gas. By adding some components to the device so as to send, after the first heating pulse of the wire, two pulses intended to effect a measurement, it will be possible to deduce from the results obtained, on the one hand, an indication on the pressure of the gas, on the other hand, an indication on its speed; as a result a single sensor will permit the development of two characteristics of the medium to be followed at once. In this case, the sensor will cool, as indicated in FIG. 6, according to a first law until moment $t_1$, then from moment $t_1$ to moment $t_2$ according to a law which corresponds firstly to an exponential characteristic extending that of the cooling from O to $t_1$, then according to a different curve, due to the intervention of a second parameter of the gas.

Figure 5:
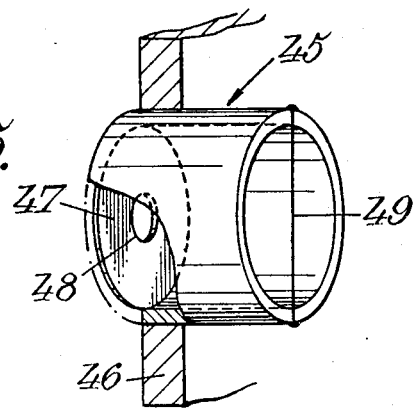
FIG. 5 is a schematic view of a speed sensor usable in a device according to the invention.

By way of example, the device illustrated in FIG. 3 may be used to measure the variations of the differential pressure between two containers, by means of a probe constituted as indicated in FIG. 5. This probe is formed by a capsule of small diameter having a casing which serves as a heat sink, of which the volume cana be of the order of a cubic millimeter. This capsule 45 includes a lateral wall mounted through the wall 46 which separates the two containers of which the differential pressure is to be measured. One of the ends of the lateral wall is closed by a bottom 47 formed with an orifice 48 of small diameter, 0.1 mm for example. The other end of the lateral wall is open and a thermoresistant wire 49 is placed diametrically and constitutes the probe. The distance between the wire and the orifice 48 is for example of the order of 0.5 mm. Such a device enables the measurement of air flow-rate of the order of 1 mm$^3$/s, which is manifested by a difference of some microbars between the two containers.

Such an assembly can also be used as an absolute manometer, by placing it between two containers one of which is kept at strictly constant pressure, or as a low inertia thermometer. The reference container can also be the free atmosphere.

Such a probe enables the measurement of absolute or differential pressures over a very extended range, from some hundredths of a pascal to $10^6$ pascals or more. It is insensitive to shock and to acceleration, and self-stabilised in temperature due to the fact that it constitutes its own thermometer, which enabes its use in very varied environments, including outer space.

We claim:

1. A device for measuring the thermal dissipation coefficient of a thermoresistant measuring sensor immersed in a fluid medium for determining a parameter characterizing said medium, said device comprising:

a pulse generator for delivering in succession to said measuring sensor a first and a second electric pulse having predetermined levels and durations sufficiently short there to be no appreciable heat transfer to the fluid medium during their duration and separated by a predetermined time interval sufficiently short for the sensor not to return to thermal equilibrium with the medium between said pulses;

a simulating circuit simulating a sensor in a reference medium and providing outputs representative of the electric resistance characteristics of said simulated sensor, means connected to said measuring sensor and said simulating circuit providing first signals representative of electric resistance characteristics of said measuring sensor and said simulated sensor during said first pulse, and second signals representative of electric resistance characteristics of said measuring sensor and said simulated sensor during said second pulse;

and means for deriving from said first signals and said second signals a third signal characterizing the thermal dissipation coefficient value of said measuring sensor in said fluid medium relative to said reference medium during the time interval separating the first and second pulses.

2. Device according to claim 1 wherein said deriving means includes means for providing the difference of two signals representative of the resistance of said measuring sensor and of said simulated sensor, respectively, during the first pulse and during the second pulse.

3. Device according to claim 2, wherein said measuring is placed in a Wheatstone resistance bridge supplied along one diagonal by said electrical pulses from said generator, the other diagonal being connected to a measuring circuit, said circuit comprising a first storage channel having gate means adapted during the first pulse to record the unbalance signal from said bridge at that time and a second storage channel having a gate adapted during the second pulse to record the unbalance signal from said bridge at that time. sensor is 4. A device according to claim 1, having means for repetitively actuating said pulse generator and said deriving means for repeating the measuring sequence at predetermined time intervals.

5. A device for repetitively measuring the thermal dissipation coefficient of a thermoresistant sensor immersed in a fluid medium for determining a parameter characterizing said medium, said device comprising: a pluse generator for delivering in succession on an output thereof a first and a second substantially square electric pulses having predetermined amplitudes and durations and separated by a predetermined time interval, said sensor being connected to said generator and said time interval being sufficiently short for the sensor not to return to thermal equilibrium with the medium between said first and second pulses; a simulating circuit simulating a sensor immersed in a reference medium and connected to said input of the pulse generator for receiving said pulses; means connected to said sensor and to said simulating circuit for delivering and storing a first signal representative of the difference between the electric resistances of said sensors during said first pulse and a second signal representative of the difference between the electric resistance of said sensors during said second pulse; and means for deriving from said first and second signals a third signal representative of the difference between said first and second signals, said third signal characterizing the thermal dissipation coefficient value of the sensor in said fluid medium relative to said reference medium during the time interval separating the first and second pulses.

6. Means for measuring the difference in pressure of a gas between two enclosures, comprising a device according to claim 5, wherein said sensor comprises a probe formed by a small capsule mounted between the two enclosures and whose envelope serves as a heat sink, and a thermoresistant wire traversing said capsule.

7. Gas pressure measuring device according to claim 6, wherein one of said enclosures is maintained at strictly constant pressure.

8. Gas pressure measuring device according to claim 6, wherein one of said enclosures is constituted by the open atmosphere.

9. A device according to claim 5 wherein said means for delivering the first and second signals includes a differential circuit that generates said first and second signals, each of said first and second signals being representative of the difference between a signal from said sensor and a signal from said simulating circuit.

10. A device according to claim 5 wherein said simulating circuit is a resistance capacitance circuit.

11. A device according to claim 10, wherein said means for providing the first and second signals comprise: a Wheatstone resistance bridge, the thermoresistant sensor being located in an arm of said bridge, said generator being connected across a diagonal of said bridge; a first storage channel having gate means enabled during the first pulse to pass the unbalance signal of the bridge at that time to storage means; and a second storage channel having a gate adapted to be enabled during the second pulse to pass the unbalance signal of the bridge at that time to storage means.

12. A device according to claim 11 wherein the means for deriving said third signal include a differential amplifier and means for applying to the inputs of said amplifier the respective signals stored by said storage means of said channels.

13. Device according to claim 11, wherein each storage channel comprises a capacitor for detecting and holding the peak value, said gate being located in the channel upstream of the capacitor, electronic means operatively associated with said generator and applying to the gate and adapting pulse during a fraction of the first pulse or of the second pulse, as the case may be.

14. Device according to claim 13, including measuring means for the difference of the unbalanced signals during the first pulse and the second pulse, comprising a differential amplifier and means for applying to one of its inputs, the signal stored by the first channel and to the other input the signal stored by the second channel.

* * * * *

UNITED STATES PATENT AND TRADEMARK OFFICE
CERTIFICATE OF CORRECTION

PATENT NO. : 3,905,230
DATED : September 16, 1975
INVENTOR(S) : Pierre Calvet and Francois Liousse It is certified that error appears in the above—identified patent and that said Letters Patent are hereby corrected as shown below:

Column 1, line 25, change "to" (first occurrence) to --of--;
    line 33, change "alternatively" to --alternately--.
Column 2, line 58, change "perponderant" to --preponderant--.
Column 3, lines 38-42, change to read:

$$q \frac{d\theta}{dt} = k (\theta - \theta_e) \qquad (1)$$

lines 51-55, change to read:

$$\theta_1 - \theta_e = (\theta_o - \theta_e) \exp\left(-\frac{k}{q} t_1\right) \qquad (2)$$

line 61, change "movement" to --moment--.
Column 4, line 42, change "not" to --now--;
    line 48, change "couterpart" to --counterpart--;
    line 49, after "will" insert --be--.
Column 5, line 29, delete "according";
    line 46, change "amplifer" to --amplifier--;
    line 57, change "of" to --a--;
    line 59, change "operation" to --operational--.

line 17, change "supplied" to --supplies--.
Column 7, line 6, change "cana" to --can--.
Column 8, line 2, after "measuring" insert --sensor--;
    line 10, delete "sensor is";
    line 28, change "input" to --output--.

Signed and Sealed this sixteenth Day of March 1976

[SEAL]

Attest:

RUTH C. MASON
*Attesting Officer*

C. MARSHALL DANN
*Commissioner of Patents and Trademarks*